United States Patent
Von-Wilmowsky

(10) Patent No.: US 9,975,630 B2
(45) Date of Patent: May 22, 2018

(54) ROTOR SYSTEM OF A ROTARY WING AIRCRAFT

(71) Applicant: AIRBUS HELICOPTERS DEUTSCHLAND GMBH, Donauworth (DE)

(72) Inventor: Kaspar Von-Wilmowsky, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 498 days.

(21) Appl. No.: 14/302,746

(22) Filed: Jun. 12, 2014

(65) Prior Publication Data

US 2014/0377067 A1    Dec. 25, 2014

(30) Foreign Application Priority Data

Jun. 24, 2013 (EP) .................................... 13400012

(51) Int. Cl.
*B64C 27/37* (2006.01)
*B64C 27/605* (2006.01)
*B64C 27/43* (2006.01)

(52) U.S. Cl.
CPC .............. *B64C 27/37* (2013.01); *B64C 27/43* (2013.01); *B64C 27/605* (2013.01)

(58) Field of Classification Search
CPC ......... B64C 27/37; B64C 27/39; B64C 27/41; B64C 27/43; B64C 27/54; B64C 27/605; B64C 27/635; B64C 27/625; B64C 2027/7238; B64C 2027/7255; B64C 27/04; B64C 27/06; F05D 2260/74; F05D 2260/75

USPC ......................... 416/134 A, 150, 210 R, 141
See application file for complete search history.

(56) References Cited

U.S. PATENT DOCUMENTS

| | | | | |
|---|---|---|---|---|
| 2,356,692 A | * | 8/1944 | Platt ....................... | B64C 27/43 416/117 |
| 2,457,429 A | * | 12/1948 | Young ..................... | B64C 27/43 416/102 |
| 2,481,750 A | * | 9/1949 | Hiller, Jr. ................. | B64C 1/06 244/17.11 |

(Continued)

OTHER PUBLICATIONS

Extended European Search Report for EP 13400012.4, Completed by the European Patent Office, dated Dec. 10, 2013, 6 Pages.

*Primary Examiner* — Igor Kershteyn
*Assistant Examiner* — Eric Zamora Alvarez
(74) *Attorney, Agent, or Firm* — Brooks Kushman P.C.

(57) ABSTRACT

A rotor system of a rotary wing aircraft, such as a helicopter, is provided. The rotor system includes a rotor mast, a rotor hub and at least four, angularly generally even distributed rotor blades and swash plate struts for pitch and subsequently flap control. The rotor blades are pairwise to each other with zero offset to the rotor hub. The rotor hub is provided with a hollow bearing with at least one further bearing inside. A first pair of rotor blades is mounted on the hollow bearing and is pivotable in a first flap direction generally perpendicular to the rotation axis. A second pair of rotor blades is mounted inside the hollow bearing on the at least one further bearing and is pivotable in a second flap direction generally perpendicular to the first flap direction and the rotation axis, and independently of the first pair of rotor blades.

20 Claims, 4 Drawing Sheets

(56) References Cited

U.S. PATENT DOCUMENTS

| | | | |
|---|---|---|---|
| 2,629,567 A * | 2/1953 | Papadakos | B64C 13/30 244/17.13 |
| 3,347,320 A | 10/1967 | Cresap et al. | |
| 3,470,962 A * | 10/1969 | Cure | B64C 27/327 416/194 |
| 3,556,673 A * | 1/1971 | Kilian | B64C 27/35 416/134 R |
| 3,804,552 A | 4/1974 | Covington | |
| 3,967,918 A * | 7/1976 | Mouille | B64C 27/35 416/102 |
| 4,028,001 A * | 6/1977 | Watson | B64C 27/48 416/134 A |
| 4,111,605 A * | 9/1978 | Roman | B64C 27/43 416/138 |
| 4,131,391 A | 12/1978 | Robinson | |
| 4,153,390 A * | 5/1979 | Weiland | B64C 27/33 416/134 A |
| 4,183,718 A * | 1/1980 | Mautz | B64C 27/45 416/134 A |
| 4,251,188 A * | 2/1981 | Schwarz | B64C 27/45 416/134 A |
| 4,293,276 A * | 10/1981 | Brogdon | B64C 27/33 416/134 A |
| 4,299,539 A * | 11/1981 | Schwarz | B64C 27/45 416/134 A |
| 4,307,996 A * | 12/1981 | Watson | B64C 27/33 416/138 |
| 4,496,284 A * | 1/1985 | Watson | B64C 27/33 416/138 |
| 4,695,227 A | 9/1987 | Head et al. | |
| 5,407,325 A * | 4/1995 | Aubry | B64C 27/51 416/106 |
| 5,853,145 A * | 12/1998 | Carter, Jr. | B64C 27/32 244/17.25 |
| 5,906,476 A * | 5/1999 | Arlton | A63H 27/12 384/513 |
| 2007/0084962 A1 | 4/2007 | Zientek | |
| 2009/0214340 A1* | 8/2009 | Berthie | B64C 27/605 416/24 |
| 2009/0214342 A1 | 8/2009 | Brindejonc | |
| 2010/0084517 A1* | 4/2010 | Benson | B64C 27/605 244/228 |
| 2012/0087797 A1* | 4/2012 | Kuntze-Fechner | B64C 27/33 416/220 A |
| 2012/0201678 A1 | 8/2012 | Hunter et al. | |

\* cited by examiner

000
ROTOR SYSTEM OF A ROTARY WING AIRCRAFT

CROSS REFERENCE TO RELATED APPLICATION

This application claims priority to European patent application No. EP 13 400012.4 filed on Jun. 24, 2013, the disclosure of which is incorporated in its entirety by reference herein.

BACKGROUND OF THE INVENTION (1) Field of the Invention

The invention is related to a rotor system of an aircraft, particularly to a rotary wing aircraft lighter in weight than 1.5 ton or to rotary wing-unmanned aerial vehicles.

(2) Description of Related Art

Rotor systems for helicopters, especially those with high performance and low-noise characteristics, are extremely expensive concerning their development, manufacturing and certification. Especially their development implies a high risk potential concerning the helicopter's and rotor system's dynamic behavior. The manufacturing and certification of a rotor system are particularly expensive, when composite structures and dampers are applied in the rotor head.

The documents U.S. Pat. No. 4,131,391 A (Robinson) and U.S. Pat. No. 3,347,320 A (Cresap) disclose two-bladed rotors, connecting two, opposing rotor blades flap- and lag stiff with each other through a yoke to the rotor hub, where this yoke can teeter about an axis being perpendicular to the rotor mast and to both longitudinal rotor blade-axes as well.

The document U.S. Pat. No. 3,804,552 A (Covington) discloses helicopters traveling in level flight to be operating in a one "g" condition; that is, the rotor is producing lift equal to the vehicle weight. In a helicopter equipped with a gimbaled, teetering rotor, which cannot transmit a rotor moment into the mast head, a control moment about the aircraft center of gravity, a requirement to command a change in aircraft attitude, is obtained by tilting the rotor and hence its thrust vector. Thus, the control moment is a function of rotor thrust and tilt angle. The rotor is capable of producing a moment, if cyclic pitch is introduced to the rotor through a normal helicopter control system. This moment may be transmitted across a gimbal, down the supporting rotor mast to exert a controlling moment about the helicopter center of gravity by means of an elastomeric hub spring, connecting the gimbaled rotor hub to the rotor mast. This spring attaches to a first flange as part of the rotor hub yoke, and a second flange bolted to the supporting mast.

The document U.S. Pat. No. 4,695,227 A (Head) discloses a universal joint for use in a pitch cone rotor system in a helicopter comprising crossed lift beams, one beam of which is coupled to the rotor hub and the other beam of which is coupled to the driven rotor shaft. The two crossed lift beams are coupled to each other through a cruciform case. The cruciform case in turn is coupled to each of the crossed lift beams by means of a plurality of flexures. The flexures and cruciform case are made of composite fiber materials and the flexures are soft enough to permit angular and translational deflections of the crossbeams with respect to each other thereby tending to smooth out and reduce sudden changes in rotor speed between the shaft and rotor system and thereby tending to make rotor speeds more uniform. The crossed lift beams are further coupled together at the center of their crossing by a flexible elastomeric tension link which conducts rotor loads between the two beams when the rotor develops negative lift loads on the ground and in flight. A hollow laminated elastomeric compression fitting is placed between the beams at their center to transmit the rotor lift force between them.

Prior art information disclosure also includes the documents: US 2007/0084962 ZIENTEK, US2009/0214342 BRINDEJONC and US2012/0201678 HUNTER.

BRIEF SUMMARY OF THE INVENTION

The objective of the invention is to provide a less noisy rotor system having with more than two blades, for an aircraft, with higher efficiency compared to conventional two-bladed rotors, with less constructive complexity, more cost efficient and with higher reliability compared to conventional rotors.

The solution is provided with a rotor system with the features according to claim 1.

According to the invention a rotor system of an aircraft comprises a rotor mast with a longitudinal axis as rotation axis, a rotor hub coaxially arranged at said rotor mast, at least four, angularly essentially even distributed rotor blades and swash plate struts mounted to each of said rotor blades for pitch and subsequently flap control. Said rotor blades are respectively pairwise mounted lag-stiff and flap-stiff to each other with zero offset to said rotor hub for rotation about said rotation axis in a substantially common rotor plane. Said rotor blades are respectively pairwise connected opposed to each other to first and second pairs and substantially symmetrical with regard to the rotor hub.

The rotor hub is provided with a hollow bearing with a further bearing inside, said hollow bearing and said further bearing inside being respectively arranged in line with said rotation axis for zero offset. The first pair of said rotor blades is mounted by means of a first yoke on the hollow bearing pivotable about a first flap axis essentially perpendicular to said rotation axis, and the second pair of said rotor blades is mounted by means of a second yoke inside the hollow bearing on the further bearing pivotable about a second flap axis substantially perpendicular to said first flap axis and said rotation axis, and independently of said first pair of connected rotor blades.

The invention proposes a "Zero-Offset" rotor, i.e. a rotor where the flapping motion of each blade is around the axis which intersects the rotor mast. Zero-Offset rotor systems transmit no bending moments on the rotor mast while cyclic pitch is applied. The invention provides the following advantages:

The inventive rotor system eliminates vibration-problems and endurance problems with low expenditure in development and manufacturing.

Complex developed and manufactured composites are not necessary in the rotor hub of the inventive rotor system.

A four-blade rotor of the inventive rotor system has an even-tempered flying behavior as a "teetering rotor system", transferring only small bending moments to the rotor mast, so that the rotor mast of the inventive rotor system can be designed relatively light.

The inventive rotor system, when equipped with four blades, with slim and shorter rotor blades, is more efficient and less noisy than a two-blade rotor.

The inventive rotor system is suitable for a helicopter's main and/or tail rotor as well as for gyrocopters. The inventive rotor system can be used as a substitute for two-blade rotors to increase the payload or performance reserve. Due to the lag-stiff connection of the rotor blades to the rotor hub, the inventive rotor system is suitable for use in tilt-rotor helicopters. In addition, the inventive rotor system can be used in aerial drones to increase the payload in comparison with a two-blade rotor.

Due to the ability of the inventive rotor system to teeter one pair of opposed rotor blades separately and independently from the other pair of opposed rotor blades, the exposure to "Coriolis" forces can be reduced by the ability of said respective pairs of rotor blades to flap separately and therefore no composite and/or elastomeric parts are needed in the rotor hub.

According to a preferred embodiment of the invention, control means are provided to control the angle of attack of the rotor blades, preferably through a common swash plate of said control means for the four rotor blades. Each of the respective pairs of rotor blades arranged oppositely to the rotor hub and connected lag-stiff and flap-stiff to each other through one of said first and second yokes, is connected to swash plate struts of said control means that are actuated each along an actuation axis essentially parallel to the rotation axis.

Each of the respective pairs of rotor blades is controllable in its teeter angle by said swash plate struts. Each of said swash plate struts is controlling its particular rotor blade's angle of attack. The teeter angle indicates the inclination of one pair of opposed rotor blades relative to the rotor mast about the associated yoke's axis. The teeter angle results from an equilibrium of aerodynamic and centrifugal forces, while cyclic pitch is applied to the rotor blades.

According to a further preferred embodiment of the invention each swash plate strut's actuation axis substantially runs through the respective yoke's axis of its actuated rotor blade and therefore through the radially extending axis of the neighbored rotor blade in a four blade rotor arrangement.

Each yoke is pivotable with the associated pair of rotor blades about one of said first flap axis or said second flap axis substantially perpendicular to the rotor mast and the longitudinal axes of the other pair of rotor blades. Each yoke is rotatable independently from the other yoke.

According to a further preferred embodiment of the invention an intersection of the respective axes of the hollow bearing and the further bearing inside is substantially located in the center of gravity of the yokes, the rotor blades and all components in-between to reduce to a minimum vibrations triggered by inertia, while cyclic pitch is applied.

According to a further preferred embodiment of the invention respective positions of the axes of the hollow bearing and the further bearing inside are defined as follows:

Position 2 is 50% of the distance between the intersection of bearing-axes of a rotor blade and the center of gravity of the rotor system, below the center of gravity. Position 2 is below the intersection of the bearing-axes of a rotor blade, moreover the Position 2 is up to 45 cm below the intersection of the respective axes of the hollow bearing and the further bearing inside on the rotation axis of the rotor mast.

Position 1 is 50% of the distance between the intersection of the bearing-axes of a rotor blade and the center of gravity of the rotor system above the center of gravity, the Position 1 is up to 10 cm above the center of gravity on the rotation axis of the rotor mast.

According to a further preferred embodiment of the invention a central piece of the hollow bearing is in the center of the rotor hub attached to the rotor mast. The central piece of the hollow bearing defines the flapping axes of the hollow bearing and the further bearing inside, said flapping axes being approximately perpendicular to each other for a four blade rotor.

According to a further preferred embodiment of the invention a lever and a control sleeve are provided for each yoke to transfer any movements from the swash plate struts to a blade holder's lever's bearing. The control sleeve is a circular bearing. Through a hollow inner ring of each circular bearing runs the longitudinal axis of the rotor blade of the other pair. The dimensions of the hollow inner ring allow the rotor blade and/or the associated yoke with tension elements inside the hollow inner ring all needed flapping movements without collision with this control sleeve, especially when cyclic pitch is applied. While applying pitch, the location of the lever and the control sleeve relative to the respective axes of the hollow bearing or the further bearing inside changes, said change for one pair of rotor blades being essentially decoupled from any flapping motions of the other pair of rotor blades.

According to a further preferred embodiment of the invention the control sleeve comprises two rings connected by a control sleeve-bearing, preferably a bush, elastomeric, roller or ball bearing as control sleeve-bearing.

According to a further preferred embodiment of the invention a blade holder is provided for each rotor blade and more than one blade holder-bolt for each blade holder are provided, in order to stiffen the rotor blade connection to the rotor hub.

According to a further preferred embodiment of the invention the rotor blades are dihedral relative to the rotor hub in order to reduce the bending moments transferred to the yokes.

According to a further preferred embodiment of the invention the pitch adjustment of the rotor blades is substantially about the rotor blade's longitudinal axis and actuated by the lever, connected to the blade holder with a rotation center for control substantially in the respective axis about which the respective yoke pivots.

According to a further preferred embodiment of the invention at least one torsional soft but tension strong tension element is arranged between the respective rotor blade with blade holder and its associated yoke for transmission of at least parts of the centrifugal forces.

According to a further preferred embodiment of the invention at least one axial bearing as torsional soft but tension strong tension element is arranged between the respective rotor blade and its associated yoke for taking up the rotor blades' centrifugal forces. The axial bearing allows transmission of the centrifugal forces of the rotor blade to the respective yoke with a simplified construction with smaller yokes and control sleeves, while adequate clearances between the control sleeves and the yokes still prevent collision. Because axial bearings, i.e. roller bearings, cannot transmit axial forces as high as the tension torsion elements with respect to their installation size, the application of axial bearings is limited to rotors, where the rotor blades' centrifugal forces do not exceed a rather low value, i.e. for a roller bearing with a 15 [mm] shaft diameter about 12 [kN].

BRIEF DESCRIPTION OF THE SEVERAL VIEWS OF THE DRAWINGS

According to a further preferred embodiment of the invention the yoke is hollow to enclose at least partly the torsional soft but tension strong tension element. Preferred embodiments of the invention are outlined by way of example with the following description with reference to the attached drawings.

DETAILED DESCRIPTION OF THE INVENTION

Figure 1:
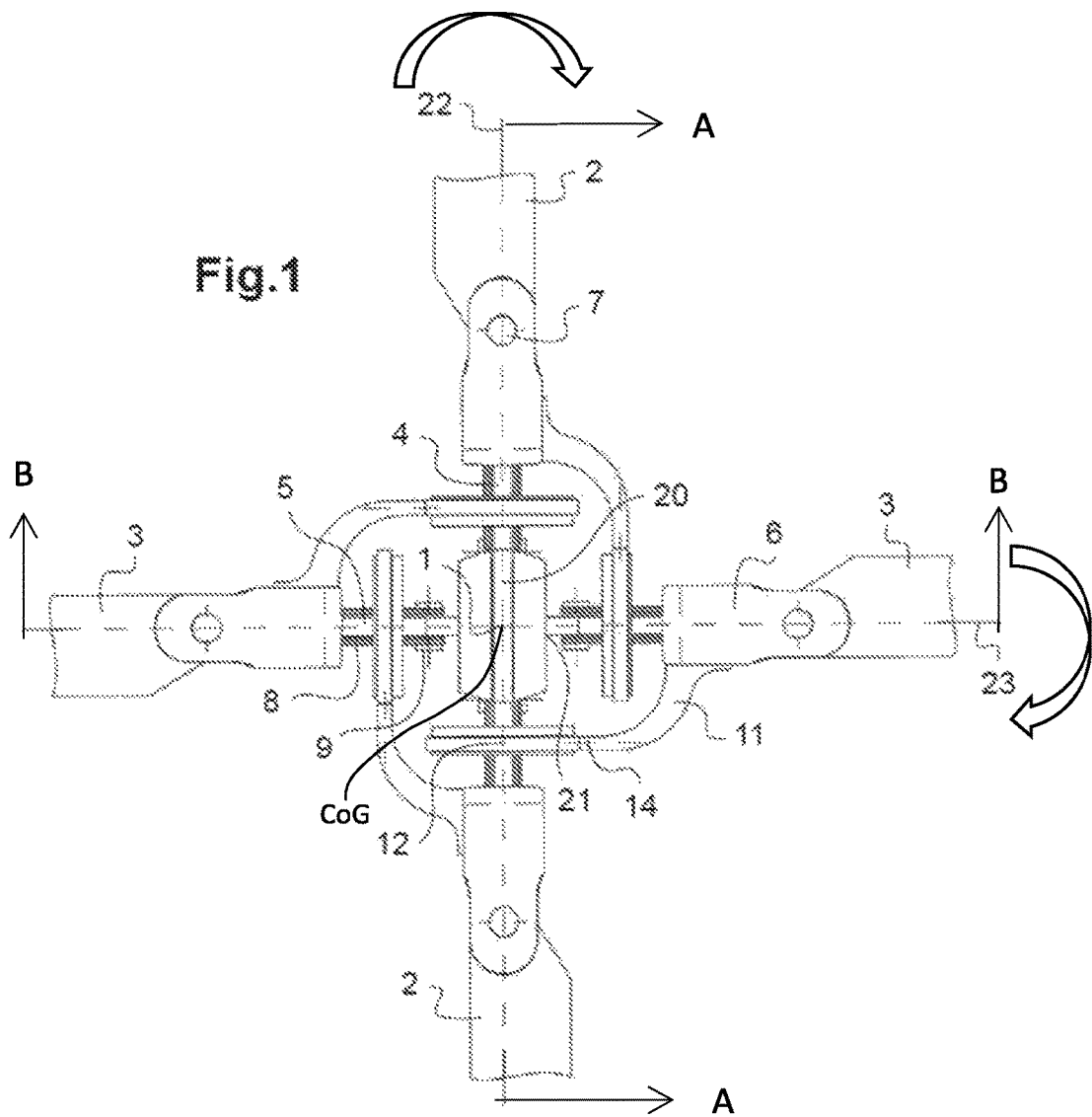
FIG. 1 shows a top view of a rotor system according to the invention.

According to FIG. 1 a rotor system has four rotor blades 2, 3 being pairwise arranged opposed to each other with the rotor hub 1 respectively in the center. Each of the rotor blades 2, 3 is mounted by means of a first yoke 4 and a second yoke 5 and respective blade holders 6 to the rotor hub 1 with a 90° angle between neighbored blades 2, 3. Two opposed first rotor blades 2 form a first pair and two opposed second rotor blades 3 form a second pair. The two opposed first rotor blades 2 of the first pair extend radially from the rotor hub 1 along a first axis 22 and the two opposed second rotor blades 3 of the second pair extend radially from the rotor hub 1 along a second axis 23, said second axis 23 being essentially perpendicular with regard to said first axis 22.

The respectively two rotor blades 2, 3 of each pair are flap- and lag-stiff connected to each other through one of the two yokes 4, 5. The flap stiffness and especially the lag stiffness of metallic connection parts of the rotor blades 2, 3 are higher than 5 $kNm^2$, to provide that the rotor blade's arrangement operates at all occurring rotor frequencies in a super critical state to exclude ground resonance in terms of backward whirling and render any additional dampers dispensable. Blade holders 6 connect each of the rotor blades 2, 3 with one of the two yokes 4, 5 by means of blade holder-bolts 7. Tension element bolts 9 are mounted to each yoke 4, 5 and to each blade holder 6. Torsional soft but tension strong tension elements 8, such as bush, elastomeric, roller and/or ball bearings especially for smaller rotors with a diameter of about 3 m, blade holders 6 and blade holder-bolts 7 transfer centrifugal forces between the respectively connected rotor blades 2, 3.

The minimum torsional softness depends on rotor frequency as a function of rotor blade's mass and rotor diameter corresponding to centrifugal forces, lever transmission ratio and means for control amplification. The minimum tension element's strength is sufficient to withstand the rotor blade's centrifugal forces inferior to 150 kN, without failure. For a big rotor with a diameter of about 10 m the torsional softness is inferior to 5 Nm/deg. Bush, elastomeric, roller and/or ball bearings are integrated in the bearings 10 of the blade holders 6.

The torsional softness of the tension elements 8 allows the swash plate struts easy variation of the respective rotor blades' angles of attack in all rotor conditions. The bearings 10 and blade holders 6 transfer bending forces between the respectively connected rotor blades 2, 3.

The tension elements 8 are arranged along an outer circumference of each of the respective yokes 4, 5. The tension elements 8 are either of one piece or composed of several thin plates with 0.01 mm to 5 mm thickness, e.g. of steel for minimal torsional stiffness.

Pitch of each of the rotor blades 2, 3 is controllable by means of a respectively associated lever 11 of the blade holder via the blade holders 6. A control sleeve 12 of two rings is connected to each of the levers 11 through a bearing 14 of the lever of the blade holder. Each of the yokes 4, 5 with their respective tension elements 8 are central with regard to their respective surrounding control sleeves 12.

The rotor hub 1 is provided with a hollow bearing 20 and with an inside bearing 21 respectively centered in line with said rotation axis of the rotor hub 1. The hollow bearing 20 is integral with the first yoke 4 and the inside bearing 21 is integral with the second yoke 5.

Figure 2:
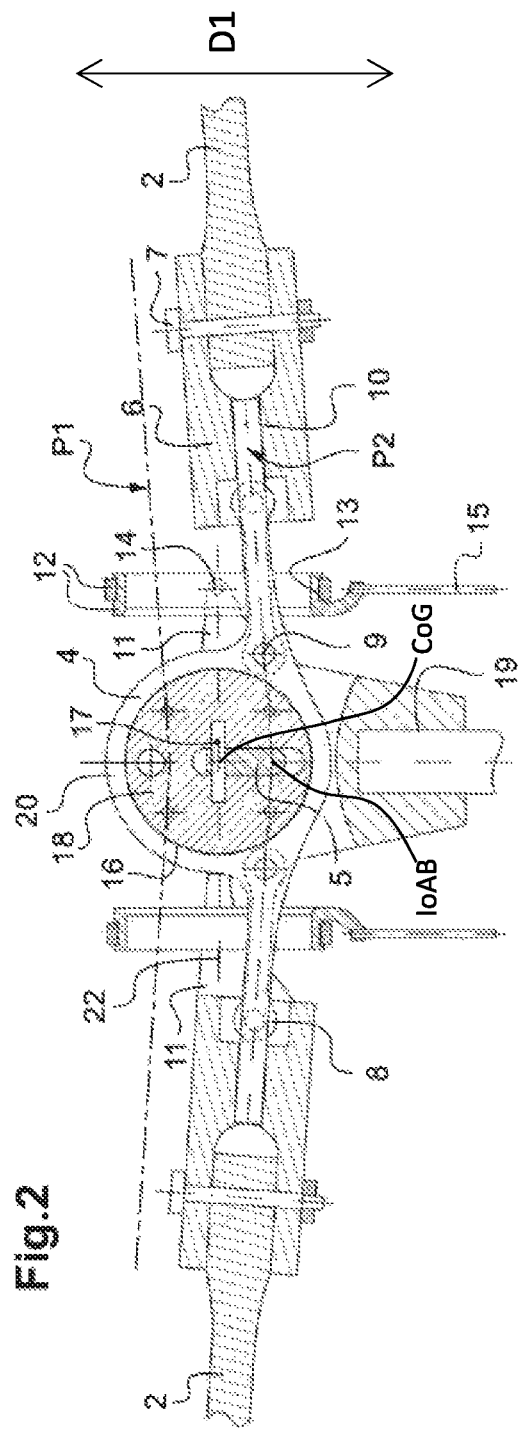
FIG. 2 shows a cross sectional view of the rotor system according to FIG. 1.

According to FIG. 2 corresponding references are referred to with the same references as in FIG. 1. The rotor mast 19 with the rotor hub 1 on top is provided with a bolt bearing 16 of a central piece 18, i.e. the hollow bearing 20. The central piece 18 is centered with regard to said rotation axis of the rotor hub 1 and provides an axis for the first yoke's 4 flapping about the first flap axis 22 essentially perpendicular to said rotation axis of the rotor mast 19 with the rotor hub 1 and essentially perpendicular to said first axis 22. The first yoke 4 is adapted to the bolt bearing 16 to allow pivoting of said first yoke 4 with said first pair of rotor blades 2 about the bolt bearing 16 of the rotor hub 1 about the first flap axis 22 thereby flapping the first yoke 4 and the first pair of rotor blades a first flap direction.

On FIG. 2, respective positions 1 and 2 of the axes of the hollow bearing 20 and the further bearing 21 inside are defined as follows:

Position 2 referenced as P2 is 50% of the distance between the intersection of bearing-axes of a rotor blade (IoAB) and the center of gravity (CoG) of the rotor system, below the center of gravity. The Position 2, called P2, is below the intersection of the rotor blade-bearing-axes IoAB. Moreover Position 2 is up to 45 cm below the center of gravity on the rotation axis of the rotor mast 19.

Position 1 referenced as P1 is 50% of the distance between the intersection of the bearing-axes of a rotor blade IoAB and the center of gravity of the rotor system, above the center of gravity. Position 1 is up to 10 cm above the center of gravity on the rotation axis of the rotor mast 19.

The control sleeves 12 with their respective control sleeve bearings 13 linked to their respective swash plate struts 15 are respectively spaced from the first yoke 4 to allow movements of the respective control sleeve bearings 13 without interference with any of the first yokes 4. The swash plate struts 15 are respectively in a plane defined by the first axis 22 along said first pair of rotor blades 2 and said rotation axis of the rotor mast 19. The control sleeves 12 are connected to the levers 11 of the blade holders, through the lever-bearing 14 of the blade holders, to control pitch of the two second rotor blades 3 of the second pair.

The rotor blades 2 are dihedral relative to the rotor mast 19 of the rotor hub 1.

Figure 3:
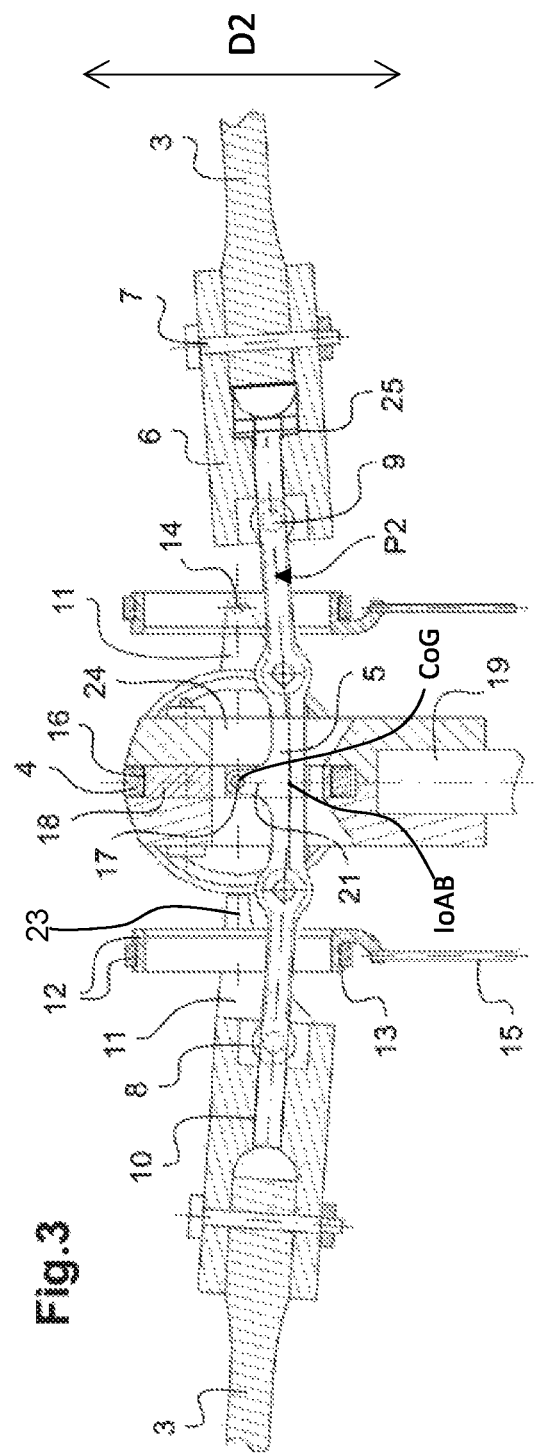
FIG. 3 shows a cross sectional view of the rotor system perpendicular to FIG. 2.

According to FIG. 3 corresponding references are referred to with the same references as in FIG. 1, 2. Inside the central piece 18 of the hollow bearing 20 is a central passage 24 with an axis along said second axis 23 essentially perpendicular to the axis 22. The inside bearing 21 is mounted to a bolt 17 centered with regard to said rotation axis of the rotor hub 1 and provides an axis for the flapping of the second yoke 5 about the second flap axis 23 essentially perpendicular to said rotation axis of the rotor mast 19 with the rotor hub 1 and essentially perpendicular to the first flap axis 22. The inside bearing 21 allows pivoting of said second pair of said rotor blades 3 about the rotor hub 1 about the second flap axis 23 in the second flap direction and independently of said first pair of connected rotor blades 2.

The control sleeves 12 with their respective control sleeve bearings 13 linked to their respective swash plate struts 15 are respectively spaced from the second yokes 5 to allow movements of the respective control sleeve bearings 13 without interference with any of the second yokes 5. The swash plate struts 15 are respectively in a plane defined by the second axis 23 along said second pair of rotor blades 3 and said rotation axis of the rotor mast 19. The control sleeves 12 are connected to the levers 11 of the blade holder—through the lever-bearing 14 of the blade holders, to control pitch of the two first rotor blades 2 of the first pair. Tension element bolts 9 are mounted to each yoke 4, 5 and to each blade holder 6.

Axial bearings 25, i.e. roller bearings or ball bearings are applied for said smaller rotors transmitting low axial/centrifugal forces from the rotor blades 2, 3 to the respective yoke 4, 5, i.e. axial bearings with a bearing shaft diameter of 15 mm for rotors with centrifugal forces less than about 12 kN, said axial bearings 25 being less bulky compared to the torsional soft but tension strong tension elements 8.

The rotor blades 3 are dihedral relative to the rotor mast 19 of the rotor hub 1.

Figure 4:
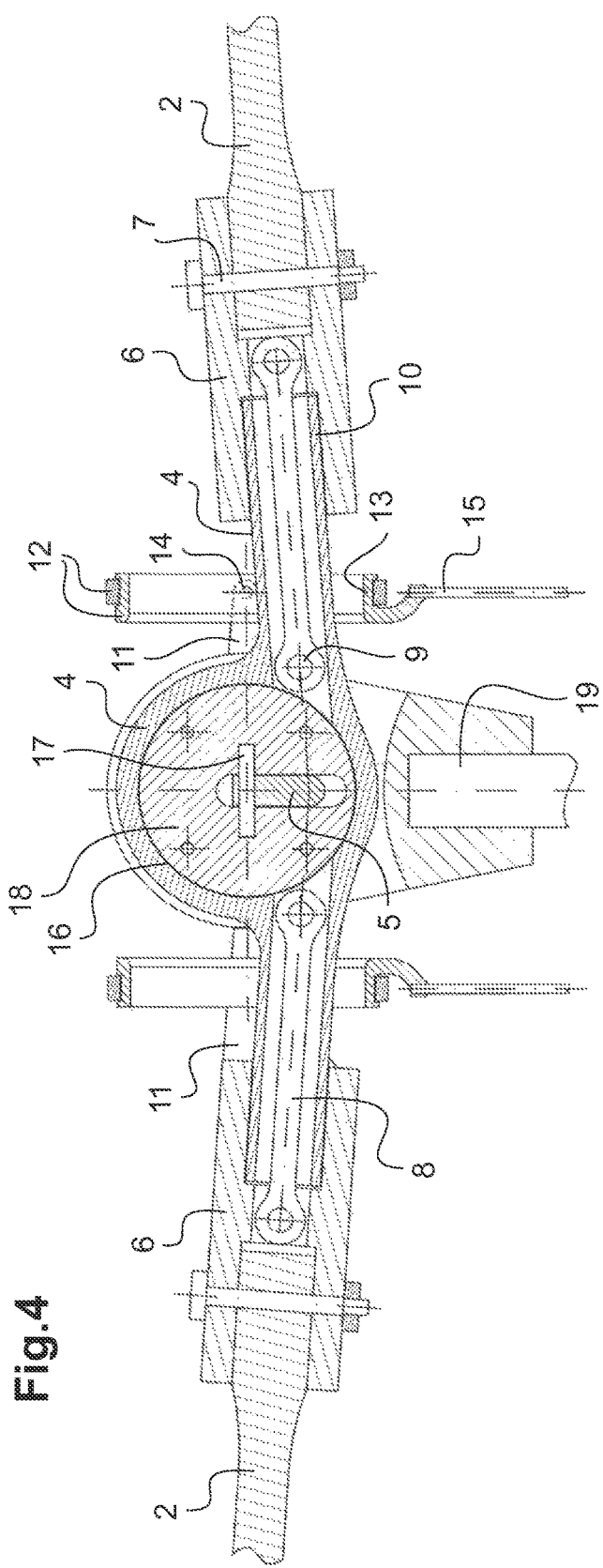
FIG. 4 shows a cross sectional view of a further rotor system according to the invention.

According to FIG. 4 corresponding references are referred to with the same references as in FIG. 1-3. The yokes 4 are hollow from the bolt bearing 16 of the hollow bearing 20 towards the blade holders 6. The yokes 4 enclose the tension elements 8 along most of their extension towards the blade holders 6.

The control sleeves 12 with their respective control sleeve bearings 13 linked to their respective swash plate struts 15 are respectively spaced from the first yoke 4 to allow movements of the respective control sleeve bearings 13 without interference with any of the first yokes 4.

More than one blade holder-bolt 7 may be used for each rotor blade 2 to be fixed to the blade holder 6 for a stiff rotor blade assembly.

The tension elements 8 are arranged along an inner circumference of each of the respective yokes 4, 5 for improved stiffness and manufacture.

REFERENCE LIST 1 rotorhub
2, 3 rotor blades
4, 5 yoke
6 bladeholder
7 bladeholder's bolt
8 tension element
9 tension element's bolt
10 blade holder's bearing
11 blade holder's lever
12 control sleeve
13 control sleeve-bearing
14 blade holder's lever's bearing
15 swash plate struts
16 bolt bearing
17 bolt
18 central piece
19 rotormast
20 hollow bearing
21 inside bearing
22 first flap direction axis
23 second flap direction axis
24 central passage
25 axial bearing
P1 Position 1
P2 Position 2

The invention claimed is:

1. A rotor system of a rotary wing aircraft comprising:
   a rotor mast with a longitudinal rotation axis, a rotor hub coaxially arranged at the rotor mast,
   at least four, angularly generally even distributed rotor blades;
   swash plate struts mounted to each of the rotor blades for pitch and subsequently flap control,
   the rotor blades being respectively pairwise mounted lag-stiff and flap-stiff to each other with zero offset to the rotor hub for rotation about the rotation axis in a generally common rotor plane, and connected opposed to each other and generally symmetrical with regard to the rotor hub, wherein:
   the rotor hub is provided with a circular hollow bearing having at least one further bearing inside the circular hollow bearing, respectively arranged in line with the rotation axis,
   a first pair of the rotor blades is mounted by means of a first yoke on the circular hollow bearing and pivotable about a first flap axis generally perpendicular to the rotation axis, and
   at least a second pair of the rotor blades is mounted by means of a second yoke that extends through the circular hollow bearing and is pivotable on the at least one further bearing about a second flap axis generally perpendicular to the first flap axis and the rotation axis, and independently of the first pair of rotor blades.

2. The rotor system according to claim 1, wherein control means are provided to control an angle of attack of the rotor blades, the control means comprising swash plate struts actuated each along actuation axes generally parallel to the rotation axis and through longitudinal axes of neighbored pairs of rotor blades.

3. The rotor system according to claim 1, wherein an intersection of an axis of the circular hollow bearing and an axis of the further bearing inside is generally located in a center of gravity of the rotor system along a longitudinal direction of the rotor mast.

4. The rotor system according to claim 1, wherein first and second positions of axes of the hollow bearing and the further bearing inside are defined as follows:
   the first position is 50% of a distance between an intersection of axes of the rotor blades and a center of gravity of the rotor system above the center of gravity in a vertical direction of the rotor mast,
   the second position is 50% of the distance between the intersection of the axes of the rotor blades and the center of gravity of the rotor system below the center of gravity in the vertical direction of the rotor mast.

5. The rotor system according to claim 4, wherein the first position is up to 10 cm above the center of gravity on the rotation axis of the rotor mast, and
   the second position is up to 45 cm below the center of gravity on the rotation axis of the rotor mast.

6. The rotor system according to claim 1, wherein a central piece of the circular hollow bearing is in a center of the rotor hub attached to the rotor mast.

7. The rotor system according to claim 1, wherein a lever and a control sleeve are provided for each yoke to transfer any movements from the swash plate struts to the respective yokes.

8. The rotor system according to claim 7, wherein the control sleeve is connected to the lever through a control sleeve-bearing, the control-sleeve bearing chosen among: a bush, elastomeric, roller or ball bearing.

9. The rotor system according to claim 1, wherein a blade holder is provided for each rotor blade and more than one bolt for each blade holder are provided.

10. The rotor system according to claim 1, wherein the rotor blades are dihedral relative to the rotor hub.

11. The rotor system according to claim 1, wherein pitch adjustment of the rotor blades is generally about a longitudinal axis of the rotor blades and is actuated by a lever connected to a blade holder.

12. The rotor system according to claim 1, wherein at least one torsional soft but tension strong tension element is arranged between the respective rotor blade with a blade holder and the associated yoke.

13. The rotor system according to claim 12, wherein at least one axial bearing is arranged between the respective rotor blade and the associated yoke.

14. The rotor system according to claim 12, wherein the yoke is hollow to enclose at least partly the torsional soft but tension strong tension element.

15. A rotor system of a rotary wing aircraft comprising:
a rotor mast having a longitudinal rotation axis;
a rotor hub having a circular hollow bearing and an inside bearing disposed inside the hollow bearing, the hollow and inside bearings arranged coaxially on the rotor mast;
four rotor blades distributed evenly about the rotor hub, the four rotor blades mounted with zero offset to the rotor hub for rotation about the rotation axis in a generally common rotor plane, four rotor blades comprising:
a first yoke connected to the circular hollow bearing and connecting a first pair of rotor blades opposed to each other and positioned generally symmetrically about the rotor hub, wherein the circular hollow bearing is pivotable thereby pivoting the first pair of rotor blades about a first flap axis generally perpendicular to the rotation axis;
a second yoke connected to the inside bearing and extending through the circular hollow bearing, the second yoke connecting a second pair rotor blades opposed to each other and positioned generally symmetrically about the rotor hub, wherein the inside bearing is pivotable thereby pivoting the second pair of rotor blades about a second flap axis generally perpendicular to the first flap axis and the rotation axis, the second pair of rotor blades pivotable independently of the first pair of rotor blades; and
swash plate struts connected to each of the four rotor blades for pitch and subsequently flap control.

16. The rotor system according to claim 15, wherein the swash plate struts are each actuated in an actuation direction being generally parallel to the longitudinal rotation axis.

17. The rotor system according to claim 15, wherein an intersection of an axis of the circular hollow bearing and an axis of the inside bearing is generally located in a center of gravity of the rotor system.

18. A rotor system of a rotary wing aircraft comprising:
a rotor mast having a longitudinal rotation axis;
a rotor hub having a circular hollow bearing and an inside bearing disposed inside the circular hollow bearing, the hollow and inside bearings arranged coaxially;
a first pair of rotor blades connected to the circular hollow bearing and positioned generally diametrically to each other, the first pair of rotor blades and the circular hollow bearing pivotable about a first flap axis generally perpendicular to the rotation axis for pitch control of the first pair of rotor blades; and
a second pair of rotor blades connected to the inside bearing and positioned generally diametrically to each other, the second pair of rotor blades and the inside bearing pivotable about a second flap axis generally perpendicular to the first flap axis and the rotation axis for pitch control of the second pair of rotor blades,
wherein the second pair of rotor blades is pivotable independent of the first pair of rotor blades.

19. The rotor system according to claim 18 wherein the rotor system further comprises swash plate struts connected to each of the rotor blades, wherein the swash plate struts are each actuated in an actuation direction being generally parallel to the rotation axis, wherein actuation of the swash plate struts controls pitch of the first and second pairs of rotor blades.

20. The rotor system according to claim 18, wherein pitch control of the rotor blades is generally about a longitudinal axis of each of the rotor blades.

* * * * *